(12) United States Patent
Pennander et al.

(10) Patent No.: US 8,354,767 B2
(45) Date of Patent: Jan. 15, 2013

(54) PERMANENT MAGNET ROTOR WITH FLUX CONCENTRATING POLE PIECES

(75) Inventors: Lars-Olov Pennander, Heislngborg (SE); Alan G. Jack, Hexham Northumberland (GB); Glynn James Atkinson, North Shields Tyne and Wear (GB)

(73) Assignee: Hoganas AB (Publ.), Hoganas (SE)

( * ) Notice: Subject to any disclaimer, the term of this patent is extended or adjusted under 35 U.S.C. 154(b) by 189 days.

(21) Appl. No.: 12/921,602

(22) PCT Filed: Mar. 18, 2009

(86) PCT No.: PCT/SE2009/050276
§ 371 (c)(1),
(2), (4) Date: Oct. 8, 2010

(87) PCT Pub. No.: WO2009/116937
PCT Pub. Date: Sep. 24, 2009

(65) Prior Publication Data
US 2011/0025140 A1  Feb. 3, 2011

Related U.S. Application Data

(60) Provisional application No. 61/064,833, filed on Mar. 28, 2008.

(30) Foreign Application Priority Data

Mar. 19, 2008  (DK) .................................. 2008 00423

(51) Int. Cl.
*H02K 1/27* (2006.01)
*H02K 1/14* (2006.01)
(52) U.S. Cl. ......... 310/156.48; 310/156.02; 310/156.55; 310/156.71; 310/257; 310/267

(58) Field of Classification Search ............ 310/156.01, 310/156.02, 156.08, 156.15, 156.25, 156.48–156.52, 310/156.55, 156.58–156.65, 156.66–156.67, 310/156.71, 257, 267
See application file for complete search history.

(56) References Cited

U.S. PATENT DOCUMENTS
4,340,833 A * 7/1982 Sudo et al. .................... 310/268
(Continued)

FOREIGN PATENT DOCUMENTS
EP  1003267 A2  5/2000
(Continued)

OTHER PUBLICATIONS
International Search Report (PCT/ISA/210) issued on May 20, 2009, by European Patent Office as the International Searching Authority for International Application No. PCT/SE2009/050276.
(Continued)

*Primary Examiner* — Burton Mullins
(74) *Attorney, Agent, or Firm* — Buchanan Ingersoll & Rooney

(57) ABSTRACT

A permanent magnet machine is provided comprising a stator and a rotor, the rotor being adapted to rotate relative to the stator, the rotor comprising a plurality of permanent magnets separated in the circumferential direction from each other by axially extending rotor pole pieces for concentrating the magnetic flux from the permanent magnets, the stator having a structure that defines axial limits of an air gap between the stator and the rotor for communicating magnetic flux between the stator and the rotor, wherein that at least some of the permanent magnets extend axially outside the axial limits of the air gap as defined by the stator structure.

12 Claims, 4 Drawing Sheets

U.S. PATENT DOCUMENTS

| | | | | |
|---|---|---|---|---|
| 4,517,483 | A * | 5/1985 | Hucker et al. | 310/156.57 |
| 4,980,593 | A * | 12/1990 | Edmundson | 310/154.26 |
| 6,323,572 | B1 * | 11/2001 | Kinoshita | 310/156.07 |
| 6,734,596 | B1 | 5/2004 | Liao | |
| 7,135,802 | B2 * | 11/2006 | Seki et al. | 310/257 |
| 2004/0108782 | A1 | 6/2004 | Enomto et al. | |
| 2007/0267929 | A1 * | 11/2007 | Pulnikov et al. | 310/156.02 |
| 2008/0054737 | A1 * | 3/2008 | Inayama et al. | 310/44 |
| 2009/0243406 | A1 | 10/2009 | Jack et al. | |
| 2012/0200177 | A1 * | 8/2012 | Atkinson et al. | 310/12.18 |

FOREIGN PATENT DOCUMENTS

WO    WO 2007/024184 A1    3/2007

OTHER PUBLICATIONS

Written Opinion (PCT/ISA/237) issued on May 20, 2009, by European Patent Office as the International Searching Authority for International Application No. PCT/SE2009/050276.

* cited by examiner

PERMANENT MAGNET ROTOR WITH FLUX CONCENTRATING POLE PIECES

FIELD OF THE INVENTION

The present invention relates to the field of a permanent magnet machine and more specific to a DC brushless permanent magnet machine.

BACKGROUND

Permanent magnet machines, and in particular DC brushless permanent magnet machines can be implemented as an electric modulated pole machine. In recent years electric machine designs evolved from modulated pole machines, claw pole machines, Lundell machines and transverse flux machines (TFM), have become more and more interesting. Electric machines using the principles of these machines were disclosed as early as about 1910 by Alexandersson and Fessenden. One of the most important reasons for the increasing interest is that the design enables a very high torque output in relation to, for example, induction machines, switched reluctance machines and even permanent magnet brushless machines. Further, such machines are advantageous in that the coil often is easy to manufacture. Examples of implementations of the modulated pole machine topology include implementations as e.g. Claw-pole-, Crow-feet-, Lundell- or TFM-machines. The flux concentrating rotor is generally speaking built up by a number of pole pieces of a soft magnetic material and an equal number of permanent magnets in between. The permanent magnets are magnetised in a circumferential direction with every second magnet having a reverse magnetisation vector direction.

State of the art rotor design use high performance NeFeB magnets to maximize the pole field strength and to minimize the performance to weight of the structure. One alternative is to use a lower performing less costly magnet but then the magnet cross-section area must be proportionally increased to achieve equal magnetic pole strength. The presently known way of arranging the lower performing magnet is to increase the rotors all over radial dimensions that will result in increased weight and moment of inertia of the rotor. The intermediate soft magnetic pole pieces must also be radially extended to be able to pick up the magnetic flux from the permanent magnets.

It is desirable to improve the performance of the electric machine and/or to reduce the production cost of such a machine without reducing its oerformance.

SUMMARY

Disclosed herein is a permanent magnet machine comprising a stator and a rotor. The rotor of the machine is adapted to rotate relative to the stator. The rotor comprises a plurality of permanent magnets separated in the circumferential direction from each other by axially extending pole pieces for concentrating the flux from said permanent magnets. The stator has a structure that defines axial limits of an air gap between the stator and the rotor for communicating magnetic flux between the stator and the rotor.

In embodiments of the permanent magnet machine disclosed herein, some or all of the permanent magnets extend axially outside the axial limits of the air gap as defined by the stator structure. The air gap between the stator and the rotor for communicating magnetic flux between the stator and the rotor will also be referred to as the active air gap. Hence, the axial length of the permanent magnets is larger than the overall axial dimension of the active air gap as defined by the axially outer limits of the air gap. Generally, the stator may comprise a soft-magnetic structure, and the axial limits of the air gap may be defined by the part of the soft-magnetic structure that faces the air gap and thus the rotor. In particular, the axial limits of the air gap may be defined by the axial limits of the part of the soft-magnetic structure of the stator that faces the air gap and thus the rotor.

Consequently, flux from a larger magnet may be concentrated into the active air gap area defined by the stator's axial dimensions, thereby increasing the performance of the machine and/or allowing use of lower performing magnets without decreasing the performance of the machine, thus reducing the production costs of the machine. Furthermore, the increased performance and/or decreased cost may be obtained without increasing the radial dimensions of the machine. In many applications an increased radial dimension is undesirable, e.g. due to space restrictions or due to the desire to reduce the moment of inertia of the rotating parts of the machine.

The stator may comprise a plurality of stator teeth each protruding in radial direction towards the rotor and having an end face facing the rotor, the end faces of the stator teeth defining the axial limits of the air gap.

In embodiments of the permanent magnet machine disclosed herein, the pole pieces are shaped such that the magnetic flux from said permanent magnets are concentrated near the active air gap area defined by the stator.

This leads to a rotor pole structure increasing the air gap flux density of the modulated pole machine. Further the moment of inertia is decreased because smaller permanent magnets can be used to obtain the desired flux and this improves the dynamic performance of the machine. Further the shape of the soft magnetic pole piece components allows flux concentration that may improve the performance of the electric machine.

In some embodiments at least one of said pole pieces has contact surfaces each abutting a corresponding contact surface of a respective neighboring permanent magnet, and a central part between the contact surfaces, wherein the central part has an axial length smaller than the axial length of the neighboring permanent magnets and/or a radial thickness smaller than a radial thickness of the neighboring permanent magnets. In some embodiments, at least one of the pole pieces is limited axially and/or radial towards said active air gap area, i.e. such that the central part of the pole piece which provides a surface adjacent to the active air gap and providing flux communication between the rotor and the stator via the active air gap has a smaller radial and/or axial dimension compared to the lateral parts of the pole piece that provide the contact surfaces to the neighboring permanent magnets.

In an embodiment at least one of the pole piece components has contact surfaces covering the surface of the neighboring permanent magnet and a central part with an extent limited in a direction towards near the active air gap area. Thereby flux from the surface of the entire permanent magnets are led and concentrated in an area improving the performance of the pole machine.

In an embodiment the pole pieces are limited axially towards near the active air gap area. By limiting the pole piece axially it is actually possible to concentrate and exploit the flux from magnets being axially wider than the stator part.

Further low performing permanent magnets are allowed to extend axially outside the stator structures axial limits and flux concentrate axially back into the active air gap area defined by the stator axial length. The axially extended soft magnetic pole pieces will allow the radial thickness of the rotor to be smaller compared to the state of art solution and thereby minimises the moment of inertia.

In an embodiment the pole pieces are limited radially towards near the active air gap area. By limiting the pole piece radially it is actually possible to concentrate and exploit the flux from magnets being radially wider than the ones used in prior art rotors.

In an embodiment the permanent magnet machine is of axial type.

In an embodiment the permanent magnet machine is of radial type.

In an embodiment at least one of said pole pieces is of compacted soft magnetic powder.

The soft magnetic powder may be a substantially pure water atomised iron powder or a sponge iron powder having irregular shaped particles which have been coated with an electrical insulation. In this context the term "substantially pure" means that the powder should be substantially free from inclusions and that the amount of the impurities O, C and N should be kept at a minimum. The average particle sizes may generally be below 300 μm and above 10 μm.

However, any soft magnetic metal powder or metal alloy powder may be used as long as the soft magnetic properties are sufficient and that the powder is suitable for die compaction.

The electrical insulation of the powder particles may be made of an inorganic material. Especially suitable are the type of insulation disclosed in U.S. Pat. No. 6,348,265, which is hereby incorporated by reference and which concerns particles of a base powder consisting of essentially pure iron having an insulating oxygen- and phosphorus-containing barrier. Powders having insulated particles are available as Somaloy®500, Somaloy®550 or Somaloy®700 available from Höganas AB, Sweden.

Thereby the integrated pole pieces are efficiently made in the same operation by use of a powder forming method where the forming is made in a single compaction tool set up.

BRIEF DESCRIPTION OF THE DRAWINGS

In the following, preferred embodiments of the invention will be described referring to the figures, where.

DESCRIPTION OF EMBODIMENTS

Figure 1:
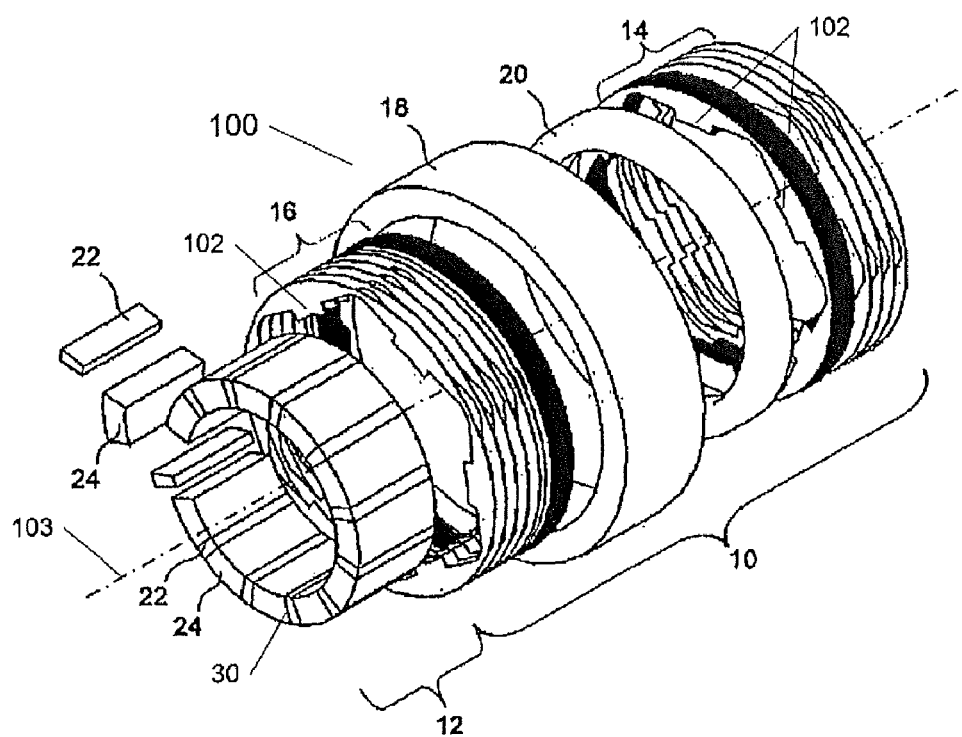
FIG. 1 is a schematic, exploded, perspective view of a state of the art radial permanent magnet machine and prior art rotor/stator design.

This invention is in the field of an permanent magnet machine 100 of which one example is shown in FIG. 1 in a schematic, exploded, perspective view. The permanent magnet machine stator 10 is basically characterised by the use of a magnetic coil, e.g. a central single winding 20, that will magnetically feed multiple teeth 102 formed by the soft magnetic core structure. The stator core is then formed around the winding 20 while for other common electrical machine structures the winding is formed around the individual tooth core section. Examples of the modulated pole machine topology are sometimes recognised as e.g. Claw-pole-, Crow-feet-, Lundell- or TFM-machines. More particularly the shown permanent magnet machine 100 comprises two stator core sections 14, 16 each including a plurality of teeth 102 and being substantially circular, a coil 20 arranged between the first and second circular stator core sections, and a rotor 30 including a plurality of permanent magnets 22. Further, the stator core sections 14, 16, the coil 20 and the rotor 30 are encircling a common geometric axis 103, and the plurality of teeth of the two stator core sections 14, 16 are arranged to protrude towards the rotor 30 for forming a closed circuit flux path as sketched in FIG. 3. The machine in FIG. 1 is of the radial type as the stator teeth protrudes in a radial direction towards the rotor in this case with the stator surrounding the rotor. However, the stator could equally well be placed interiorly with respect to the rotor which type is also illustrated in some of the following figures. The scope of invention as presented in the following is not restricted to any specific type of permanent magnet machine and can equally well be applied to machines of both the axial and the radial type and for both interiorly and exteriorly placed stators relative to the rotor. Similarly, the invention is not restricted to single phase machines but can equally well be applied to multi phase machines.

The active rotor structure 30 is built up from an even number of segments 22, 24 whereas half the numbers of segments also called pole pieces 24 are made of soft magnetic material and the other half of number of segments of permanent magnet material 22. The permanent magnets and the pole pieces are arranged in an alternating fashion. The state of art method is to produce these segments as individual components. Often the number of segments can be rather large typically of order 10-50 individual pieces. The permanent magnets 22 are arranged so that the magnetization directions of the permanent magnets are substantially circumferential, i.e. the north and the south pole, respectively, is facing in a substantially circumferential direction.

Further, every second permanent magnet 22, counted circumferentially is arranged having its magnetization direction in the opposite direction in relation to the other permanent magnets. The magnetic functionality of the soft magnetic pole pieces 24 in the desired machine structure is fully three dimensional and it is required that the soft magnetic pole piece 24 is able to efficiently carry magnetic flux with high magnetic permeability in all three space directions. A traditional design using laminated steel sheets will not show the required high permeability in the direction perpendicular to the plane of the steel sheets and its here beneficial to use a soft magnetic structure and material that shows a higher magnetic flux isotropy than a state of art laminated steel sheet structure.

Figure 2:
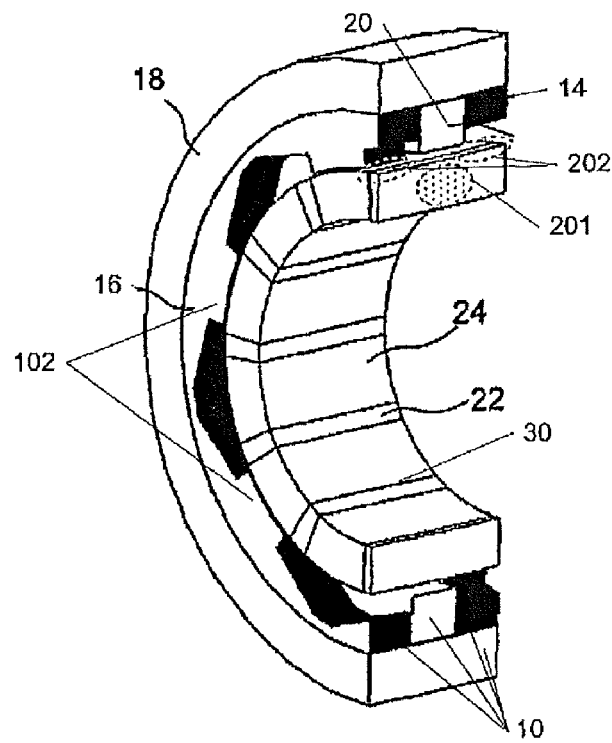
FIG. 2 is a cross-sectional view of the radial permanent magnet machine in FIG. 1.

FIG. 2 shows the same radial permanent magnet machine as from FIG. 1 but in a cross-sectional view of the assembled machine showing more clearly how the stator teeth 102 extend towards the rotor and how the stator teeth of the two stator core sections 14, 16 are rotationally displaced in relation to each other.

Figure 3A:
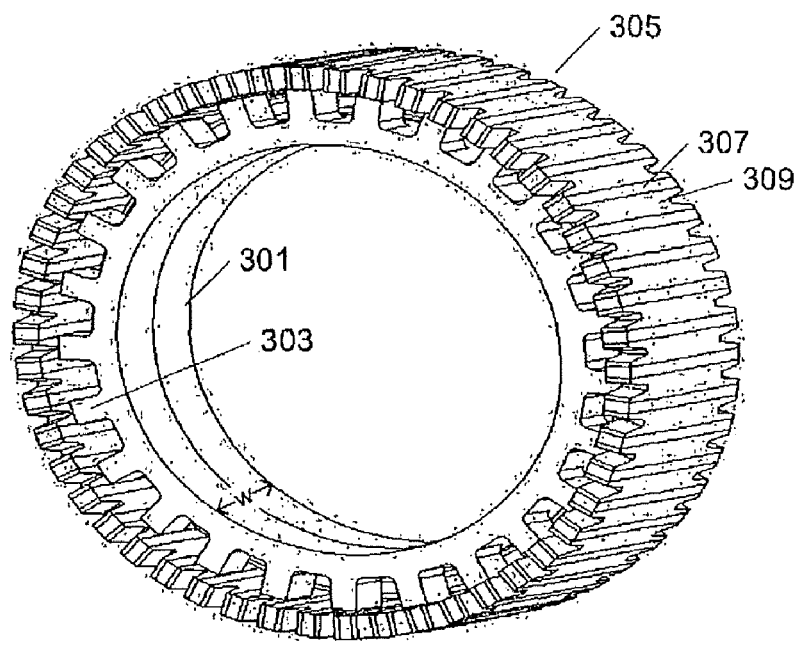
FIG. 3a illustrates an example of an electrical machine with a stator and a rotor with axially extended flux concentration.
Figure 3B:
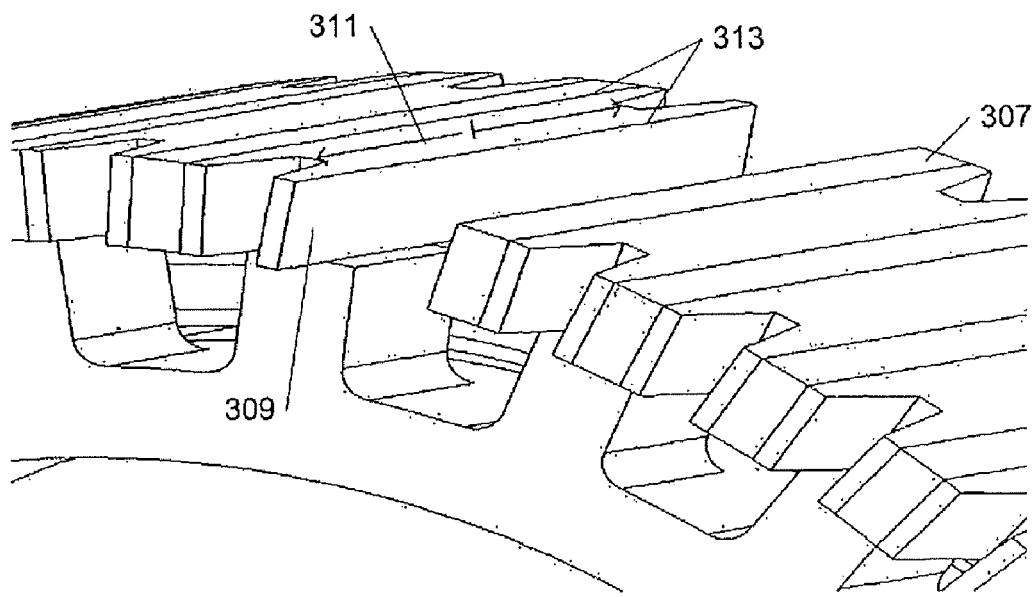
FIG. 3b illustrates the rotor pole pieces of a rotor with axially extended flux concentration.

FIGS. 3a and 3b illustrates an example of an electrical machine with a stator and a rotor according to the present invention. The stator 301 has teeth 303 and is positioned inside the rotor 305. The rotor 305 comprises permanent magnets 307 and rotor pole pieces 309. FIG. 3b illustrates the rotor pole pieces of the above described rotor where a rotor pole piece and a permanent magnet have been removed for illustrative purpose. The rotor pole pieces 307 are shaped such that the magnetic flux from the permanent magnets is concentrated near the active air gap area between the stator and rotor. The permanent magnets 307 are axially longer than the axial length of the stator 301 and in order to concentrate the flux near active air gap defined by the length w of the stator, the central part of the rotor pieces 311 are axially limited towards the active air gap defined by the length w of the stator 303. In this example the length l of the central part corresponds to the total length w of the stator. In order to concentrate flux from the entire permanent magnet the rotor pieces have end parts with contact surfaces 313 covering the entire surface of the neighboring permanent magnet.

FIG. 4 illustrates examples of the relative dimensions of the permanent magnets and the stator teeth.

Figure 4A:
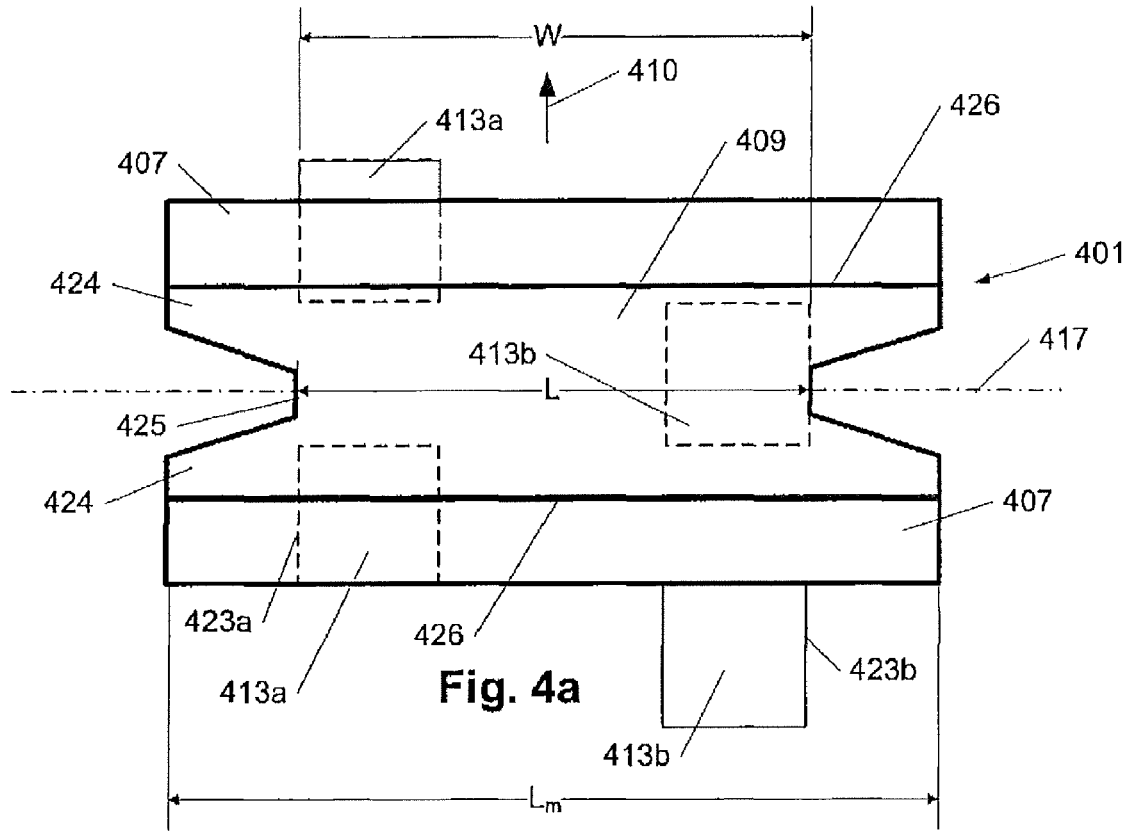
FIG. 4 illustrates examples of the relative dimensions of the permanent magnets and the stator teeth.

FIG. 4a shows a view of a part of the rotor 401, the part comprising rotor pole piece 409 and its two neighboring permanent magnets 407. The permanent magnets 407 and the rotor pole piece 409 each are elongated in a direction parallel with the axis of rotation 417 of the rotor. The axial length of the permanent magnet is denoted $L_m$. During rotation of the rotor the shown rotor pole piece moves in the direction indicated by arrow 410. FIG. 4a further illustrates end faces 413a, 413b of the stator teeth positioned opposite the rotor pole piece 409 and the permanent magnets 407, i.e. the end faces 413a, 413b face the rotor and are separated from the rotor by the active air gap. Generally, the axial length W of the active air gap is defined by the overall axial dimension of the stator, and in particular by the overall axial length of the part of the stator structure that is radially proximal to the rotor. In this embodiment the stator comprises two sets of stator teeth having respective sets of end faces 413a and 413b, respectively, that are axially displaced from the end faces of the corresponding other set of stator teeth. Hence, the length W of the active air gap is defined by the axial distance between the axially most outward boundaries 423a and 423b of the end faces of the respective sets of end faces. Furthermore, in this embodiment, the elongated rotor pole piece 409 has laterally outer parts 424 that provide contact surfaces 426 to the respective neighboring permanent magnets, and a central part 425. The laterally outer parts 424 and the central part 425 have different axial length. In particular, the axial length L of the central part is smaller than the axial length of the permanent magnets 407 and smaller than the axial length of the laterally outer parts 424 of the rotor pole piece 409. In this example the laterally outer parts have an axial length equal to the axial length $L_m$ of the permanent magnet. Hence the contact surfaces 426 of the rotor pole piece cover the entire axial length of the permanent magnets 407. In the example of FIG. 5, the central part 425 has a length L that is equal to the length W of the active air gap, thereby directing and concentrating the magnetic flux from the entire length of the permanent magnet towards the active air gap and minimizing magnetic losses. Nevertheless, it will be appreciated that the length of the laterally outer parts may differ from the length of the permanent magnets and/or the length of the central part may differ from the length W of the active air gap as defined by the axial dimension of the stator. Furthermore, as will be described below, the thickness of the rotor pole piece 409 in the direction normal to the plane of the drawing may also vary laterally and/or longitudinally across the rotor pole piece. Hence, in use the circumferential magnetic flux generated by the permanent magnets 407 enters the rotor pole piece 424 via contact surfaces 426 and is guided and concentrated towards the central part 425 where the flux exits the permanent magnet towards the stator, i.e. in this embodiment in radial direction. Hence, rotor pole piece 424 receives flux from the entire axial length of the permanent magnets, and in particular from an area having a larger axial length than the active air gap, and concentrates the flux towards the more narrow active air gap, thus providing an efficient utilization of the magnetic flux generated by the permanent magnets that are axially linger than the air gap.

Figure 4B:
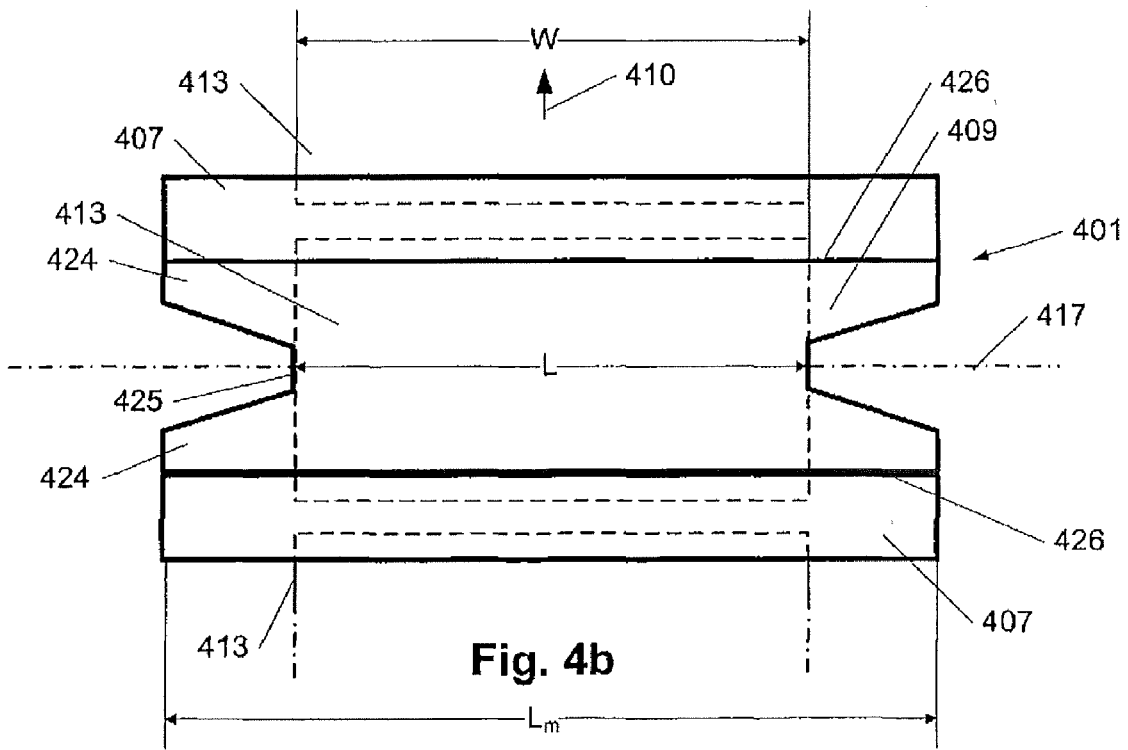

FIG. 4b shows another example, similar to the example of FIG. 4a, but for a different type of permanent magnet machine in which the end faces 413 of the stator teeth axially extend over the entire length L of the active air gap.

Figure 5A:
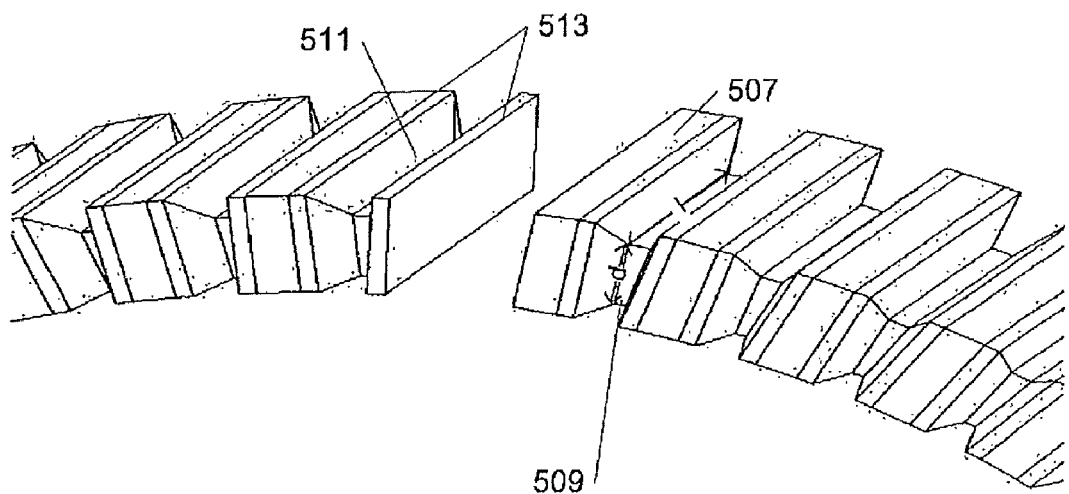
FIG. 5a illustrates the rotor pole pieces of a rotor with axially and radially extended flux concentration.
Figure 5B:
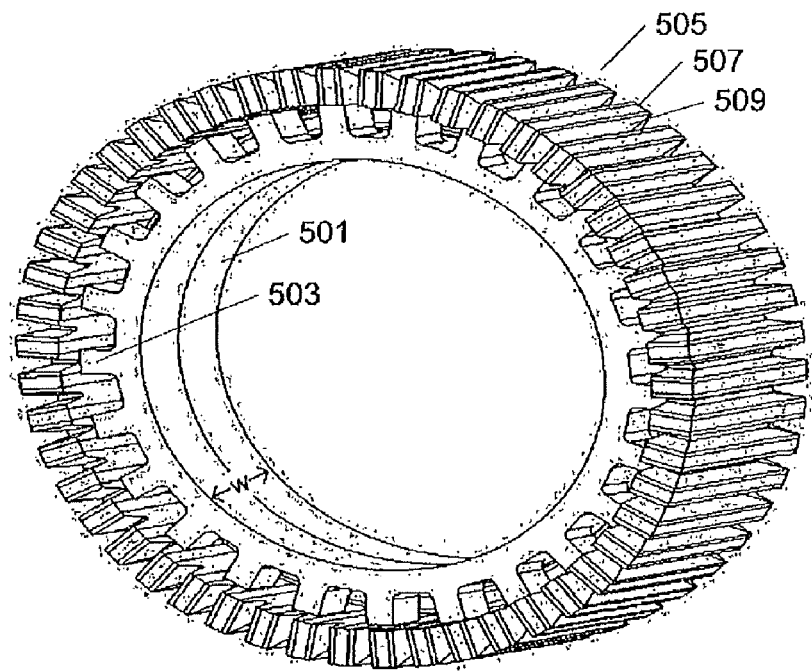
FIG. 5b illustrates an example of an electrical machine with a stator and a rotor with axially and radially extended flux concentration.

FIGS. 5a and 5b illustrate an embodiment of an electrical machine with a stator and a rotor. The stator 501 has teeth 503 and is positioned radially inside the rotor 505, i.e. in a so-called outer rotor configuration. The rotor 505 comprises permanent magnets 507 and rotor pole pieces 509 as described above. FIG. 5a illustrates the rotor pole pieces of the above described rotor where a rotor pole piece and a permanent magnet have been removed for illustrative purpose. The rotor pole pieces 509 are shaped such that the magnetic flux from the permanent magnets is concentrated near the active air gap area between the stator and rotor. In this embodiment the permanent magnets 507 are both axially and radially wider than the central part 511 of the rotor pole pieces 509 in order to concentrate the flux near the active air gap, i.e. the central part 511 of the rotor pieces 509 are axially and radially limited towards the active air gap. In this example the axial length l of the central part corresponds to the total axial length w of the stator and further the radial depth/thickness d of the central part 511 is limited towards the air gap near the stator. In order to concentrate flux from the entire permanent magnet the rotor pieces has end parts with contact surfaces 513 covering the entire surface of the neighboring permanent magnet.

Although some embodiments have been described and shown in detail, the invention is not restricted to them, but may also be embodied in other ways within the scope of the subject matter defined in the following claims. For example, the invention has mainly been described in connection with a symmetric rotor structure in which the permanent magnets are arranged with their lateral surfaces aligned in the radial direction. It will be appreciated, however, that in some embodiments, other rotor arrangements may be used such as a buried magnet rotor structure, a structure with V-shaped poles, a rotor with dovetail design, etc., or combinations thereof. The rotor structure described in this application may also be used in an AC synchronous permanent magnet machine.

The invention claimed is:

1. A permanent magnet machine comprising a stator and a rotor, the rotor being adapted to rotate relative to the stator, the rotor comprising a plurality of permanent magnets separated in the circumferential direction from each other by axially extending rotor pole pieces for concentrating the magnetic flux from said permanent magnets, the stator having a structure that defines axial limits of an air gap between the stator and the rotor for communicating magnetic flux between the stator and the rotor, wherein at least some of the permanent magnets extend axially outside the axial limits of the air gap as defined by the stator structure, and wherein at least one of said pole pieces has contact surfaces each abutting a corresponding contact surface of a respective neighboring permanent magnet and a central part between the contact surfaces, wherein the central part has an axial length smaller than an axial length of the neighboring permanent magnets, wherein the stator comprises a plurality of stator teeth each protruding in radial direction towards the rotor and having an end face facing the rotor, the end faces of the stator teeth defining the axial limits of the air gap, the permanent magnet machine further comprising at least two sets of stator teeth having respective sets of an end faces that are axially displaced from the end faces of the corresponding other set of stator teeth, each end face having a boundary proximal to the end faces of the respective other set, and a boundary distal to end faces of the respective other set, and wherein the axial limits of the air gap are defined by the distal boundaries of end faces of the at least two sets of stator teeth.

2. The permanent magnet machine according to claim 1, wherein at least one of said pole pieces has contact surfaces each abutting a corresponding contact surface of a respective neighboring permanent magnet and a central part between the contact surfaces, wherein the central part has a radial thickness smaller than a radial thickness of the corresponding neighboring permanent magnets.

3. The permanent magnet machine according to claim 2, wherein at least one of said pole pieces has contact surfaces covering the entire respective contact surface of the respective neighboring permanent magnet.

4. The permanent magnet machine according to claim 3, wherein the stator comprises a plurality of stator teeth each protruding in radial direction towards the rotor and having an end face facing the rotor, the end faces of the stator teeth defining the axial limits of the air gap.

5. The permanent magnet machine according to claim 2, wherein the stator comprises a plurality of stator teeth each protruding in radial direction towards the rotor and having an end face facing the rotor, the end faces of the stator teeth defining the axial limits of the air gap.

6. The permanent magnet machine according to claim 2, wherein the pole pieces are shaped such that the magnetic flux from said permanent magnets are concentrated near the air gap between the stator and the rotor.

7. The permanent magnet according to claim 2, wherein at least a part of the stator is made of compacted soft magnetic powder.

8. The permanent magnet machine according to claim 1, wherein the stator comprises a magnetic flux generation means arranged to generate magnetic flux guided towards the stator teeth so as to generate magnetic flux in the air gap between the stator and the rotor for causing the rotor to rotate relative to the stator.

9. The permanent magnet machine according to claim 1, wherein the pole pieces are shaped such that the magnetic flux from said permanent magnets are concentrated near the air gap between the stator and the rotor.

10. The permanent magnet machine according to claim 1, where at least one of said pole pieces is of compacted soft magnetic powder.

11. The permanent magnet machine according to claim 1, where at least at part of the stator is made of compacted soft magnetic powder.

12. The permanent magnet machine according to claim 1, wherein the stator comprises a magnetic flux generation means arranged to generate magnetic flux guided towards the stator teeth so as to generate magnetic flux in the aft gap between the stator and the rotor for causing the rotor to rotate relative to the stator.

* * * * *